June 21, 1960
E. P. MORSE
2,941,268
CLIP FOR SPECTACLE RETAINERS
Filed May 9, 1955
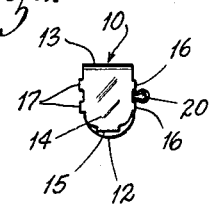
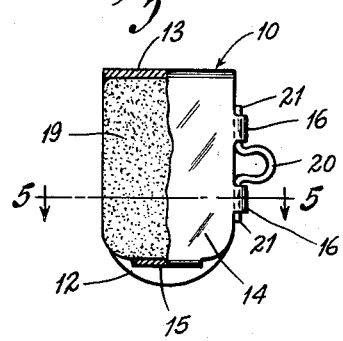
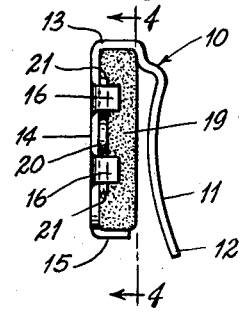
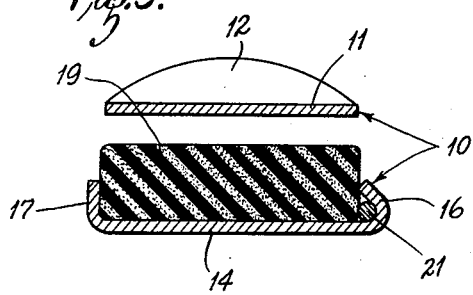
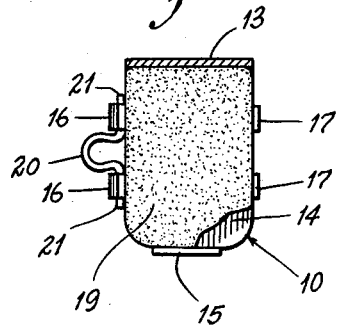
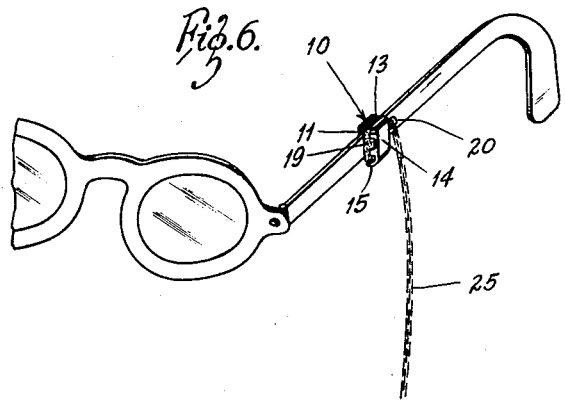
INVENTOR:
ELEANOR PENDLETON MORSE
BY Kingsland, Rogers & Ezell
ATTORNEYS

United States Patent Office 2,941,268
Patented June 21, 1960

2,941,268
CLIP FOR SPECTACLE RETAINERS
Eleanor P. Morse, 25 Beacon Hill, Creve Coeur, Mo.
Filed May 9, 1955, Ser. No. 506,812
4 Claims. (Cl. 24—73)

The present invention relates to a clip to be used with spectacle retainers so that they may be removably attached to the temple bars of spectacle frames.

Heretofore, spectacle retainers have been designed in two principal types. The first type is the one wherein there are elastic socket elements that are adapted to receive the ends of the temple bars back of the ears. And the other is the type that is adapted to slide over or clip onto the sides or mid-portions of the temple bars, usually ahead of the ears. The present invention relates to the latter type.

In the present invention, the principal object is to provide clips of this type that are U-shaped so that they may be slipped laterally onto temple bars of spectacles, and they will securely and yet releasably engage the temple bars. To this end, it is an object of the invention to provide such clips, each of which contains yieldable friction means in the nature of a block of rubber to be tightly pressed against the side of the temple bar to prevent the temple bar from becoming disengaged from the clip, as that could cause the spectacles to be dropped.

Another object of the invention is to provide such a clip that is in one piece, without relatively movable parts. This minimizes the possibility that the clip may come off the temple bars, and also it makes the manufacture of the clip less expensive.

A further object of the invention is to provide such a clip that is formed so as to receive an eyelet by which the chain, ribbon or band of the spectacle retainers may be attached to the clip.

Other objects will appear from the description to follow.

In the drawing:

Figure 1 is a front elevation of the clip in approximately its actual size;

Figure 2 is an enlarged front view, partly broken away;

Figure 3 is a side elevation from the right side of Figure 2;

Figure 4 is a vertical medial section through the clip on the line 4—4 of Figure 3;

Figure 5 is a horizontal section through the clip, taken on the line 5—5 of Figure 2; and Figure 6 is a perspective view of the clip in place on the temple bar of a pair of spectacles.

The clip consists essentially of a U-shaped body member 10. This body member is made of some metal, or the like, that is resilient but strong enough for the purposes of its usage. A spring-type bronze or spring-type steel are satisfactory materials, although others can be used. This body member can be formed in conventional metal forming devices so that it has a first leg 11 preferably concavely curved, a bight portion 13, and another leg 14, the leg 14 having an inturned end 15 and inturned side lugs 16 on one side and 17 on the other side. The bight portion 13 provides a ledge opposite to the inturned end 15. The side lugs 16 and 17 cooperate with the end 15 and the ledge 13, to grasp and hold a cushion pad 19 formed of material such as a firm grade of foam rubber. This pad holds the clip to the temple bars of spectacles.

An eye 20 may be formed of wire, or the like, with two outstanding ends 21. The ends 21 fit under the side lugs 16, and are confined by those lugs and the pad 19, with a limited amount of rocking movement of the eye 20 permitted.

The eye 20 is adapted to receive the end of a chain, cord, or the like 25. This cord extends around the neck of the wearer and engages another clip 10 on the opposite temple bar (not shown) of the spectacles of Figure 6.

The present spectacle retaining clip has the advantages that it can be made inexpensively by stamping and metal forming processes, or may be molded in the event it is made of a moldable material. The pad 19 can be held firmly in place by having the lugs 15, 16 and 17 and the ledge 13 somewhat convergent outwardly from the inner surface of the leg 14, so that they will tightly engage and hold the pad. It also may be cemented to the inner face of the leg 14 of the clip.

The eye 20 provides a desirable means for securing the cord 25, because it is pivotal with respect to the clip 10 and yet may be formed very inexpensively. If desired, it may be attached to the cord 25 prior to being inserted into the clip.

In use the clip is slipped over the temple bar of spectacles by application of pressure to the bight end. The resilience of the material of which the clip 10 is made and the resilience of the pad 19 cause it to adhere tightly to the clip. It should be made with a close fit. If any difficulty comes about in applying it to the temple bar, the pad may be wetted, and this will facilitate the passage of the clip onto the temple bar.

The outer lip 12 on the leg 11 of the clip aids in receiving the temple bar and guiding it into its location between the pad and the clip.

This type of spectacle retainer has the advantage that the clips are engageable ahead of the ears and thereby do not interfere with the coiffure of the wearer. Of course, the clip may be applied back of the ears, if desired.

What is claimed is:

1. A clip for spectacle retainers and like objects having temple bars, comprising: a unitary body member of U-shaped, hard resilient material having opposite first and second legs spaced apart from one another and connected by an integral bight portion; a resilient friction pad on the inner face of the first leg; means integral with that first leg engaging the pad to hold it onto the leg, the pad having an inner surface opposite the inner surface of the second leg, the bight portion holding the legs resiliently relatively close together so that they must be separated to be fitted over a spectacle temple bar, and clamp against the temple bar; and means to secure a cord or like to the body member; the means to hold the pad onto the leg comprising a part of the bight portion of the U-shaped body member, the said part extending transversely with respect to the first leg to provide a ledge portion for receiving the upper edge of the pad, and integral, inwardly-turned, lug elements on the first leg engaging the pad at points spaced from the ledge and cooperating with the ledge to confine the pad.

2. The combination of claim 1, wherein the means to secure the cord to the body member comprises a pivotable eye member having opposite ends laterally projecting beyond a medial loop, the ends being pivotally connected between adjacent lugs and the pad and with the loop portion extending outwardly from between the lugs.

3. The combination of claim 1 with the body member having its bight portion at an angle to the first leg, the edge of the pad engaging that bight portion, and the second leg extending from the bight portion a short distance over the opposite face of the pad, and then being displaced away from the pad to provide the space to receive the temple bar.

4. The combination of claim 3 with the lug elements positioned on the side and outer edges of the body member on the first leg and are angled toward the second leg.

References Cited in the file of this patent

UNITED STATES PATENTS

| | | |
|---|---|---|
| 807,691 | Smith et al. | Dec. 19, 1905 |
| 1,258,258 | Sawyer | Mar. 5, 1918 |
| 1,768,005 | Schwartzman | June 24, 1930 |
| 1,939,617 | Bernhard | Dec. 12, 1933 |
| 2,541,493 | Barroso | Feb. 13, 1951 |
| 2,648,255 | Pendleton | Aug. 11, 1953 |
| 2,649,020 | Wheeler | Aug. 18, 1953 |
| 2,766,500 | Chanko | Oct. 16, 1956 |
| 2,798,409 | Speers | July 9, 1957 |